US012794807B2

(12) United States Patent
Beracha et al.

(10) Patent No.: US 12,794,807 B2
(45) Date of Patent: Nov. 10, 2026

(54) ROUTING USING PACKET HEADERS

(71) Applicant: MELLANOX TECHNOLOGIES, LTD., Yokneam (IL)

(72) Inventors: Eran Gil Beracha, Tel Aviv (IL); Roee Levy Leshem, Tel Aviv (IL); Liron Mula, Herzliya (IL); Ilya Vershkov, Rishon LeZion (IL); Aviv Kfir, Nili (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 134 days.

(21) Appl. No.: 18/967,592

(22) Filed: Dec. 3, 2024

(65) Prior Publication Data

US 2026/0156077 A1 Jun. 4, 2026

(51) Int. Cl.

*H04L 45/748* (2022.01)
*H04L 45/00* (2022.01)
*H04L 45/745* (2022.01)

(52) U.S. Cl.

CPC .......... *H04L 45/748* (2013.01); *H04L 45/566* (2013.01); *H04L 45/74591* (2022.05)

(58) Field of Classification Search

CPC ................. H04L 45/748; H04L 45/566; H04L 45/74591

See application file for complete search history.

(56) References Cited

U.S. PATENT DOCUMENTS

| | | | | |
|---|---|---|---|---|
| 7,403,542 | B1 * | 7/2008 | Thompson | H04L 69/163 709/250 |
| 9,270,592 | B1 * | 2/2016 | Sites | H04L 45/7453 |
| 2012/0250687 | A1 * | 10/2012 | Cao | H04L 45/02 370/392 |
| 2015/0146539 | A1 * | 5/2015 | Mehta | H04L 47/125 370/237 |

* cited by examiner

*Primary Examiner* — El Hadji M Sall

(74) *Attorney, Agent, or Firm* — Sheridan Ross P.C.

(57) ABSTRACT

Systems, devices, and methods are provided. In one example, a system receives a packet that includes at least one packet header field. The system copies relevant bits from the at least one packet header field to a hash register. The system also performs a search in a table for the copied relevant bits from the at least one packet header field, and in response to finding a match in the table, routes the received packet based on the copied relevant bits from the at least one packet header field. The table correlates the copied relevant bits from the at least one packet header field with an egress port or an egress routing information field (RIF).

20 Claims, 4 Drawing Sheets

*Fig. 3*
300
Key Value: Egress Port 306
Match
Key
Value
Packet.header.field.value0
Egress_portA
Packet.header.field.value1
Egress_portB
Packet.header.field.value2
Egress_portC
Packet.header.field.valueN
Egress_portX
324
Hash Engine 322
Packet Header Field(s) 302

ROUTING USING PACKET HEADERS

FIELD OF THE DISCLOSURE

The present disclosure is generally directed toward routing and, in particular, toward routing using packet headers and devices of performing the same.

BACKGROUND

Switches and similar network devices represent a core component of many communication, security, and computing networks. Switches are often used to connect multiple devices, device types, networks, and network types.

Devices including but not limited to personal computers, servers, and other types of computing devices, may be interconnected using network devices such as switches. Such interconnected entities may form a network enabling data communication and resource sharing among the nodes. Packet routing is the process of forwarding packets from their source to their destination through intermediate nodes. Often multiple potential paths for data flow may exist between any pair of devices (e.g., a source and destination). This feature allows data to traverse different routes from a source device to a destination device. Such a network design enhances the robustness and flexibility of data communication as it provides alternatives in case of path failure, congestion, or other adverse conditions. Moreover, such a network design facilitates load balancing across the network, optimizing the overall network performance and efficiency.

BRIEF SUMMARY

There has been an explosion in the amount of data that computers maintain and process. Social media, artificial intelligence (AI), and the Internet of Things have all created needs to store and quickly process vast amounts of data.

The trend in modern computing has been to deploy high performance, massively parallel processing systems, thus breaking up large computation tasks into many smaller ones that can be performed concurrently. As such parallel processing architectures have become widely adopted, this has in turn created demand for large capacity, high performance, low latency memory that can store large amounts of data and provide parallel processors with quick access.

Additionally, even though modern system memory capacity might seem relatively abundant, some massively parallel processing systems are now pushing the envelope in terms of memory capacity. System memory capacity is generally limited based on the maximum address space of whatever CPU(s) is employed. For example, many modern CPUs are unable to access more than approximately three terabytes (TBs). This capacity (three million bytes) may sound like a lot but may not be enough for certain massively parallel GPU operations such as deep learning, data analytics, medical imaging, and graphics processing.

Data centers and other computing environments, such as those employing AI training systems, use a network infrastructure, which may be referred to as a fabric, which provides interconnectivity between various components, facilitating rapid data transfer and communication for handling large volumes of data and computationally intensive tasks. Such computing environments may utilize a fabric of processing devices such as GPUs and switches to provide computing capabilities for hosts devices such as personal computers and servers.

In accordance with one or more embodiments described herein, a communication network enables a diverse range of systems, such as switches, servers, client devices, personal computers, and other computing devices to communicate. Ports in each device may function as communication endpoints, allowing each device to manage multiple simultaneous network connections with one or more other devices.

When a device receives a packet, the packet forwarding engine (PFE) identifies the next hop. If there are multiple equal-cost paths (ECMPs) to the same destination, the PFE can distribute the flow between the next hops. The PFE uses a hash computation result over select packet header fields and internal fields to select the forwarding next hop. In embodiments, a client device may choose the path to a destination by correlating packet header information with one or more specific egress ports. Having the client device tell a network device how to route a packet may improve load balancing and network performance.

The present disclosure describes systems, devices, and methods for enabling direct routing based on packet header fields. As an illustrative example aspect of the systems and methods disclosed, a system may include one or more circuits to: receive a packet that includes at least one packet header field; copy relevant bits from the at least one packet header field to a hash register; perform a search in a table for the copied relevant bits from the at least one packet header field; and in response to finding a match in the table, route the received packet based on the copied relevant bits from the at least one packet header field, wherein the table correlates the copied relevant bits from the at least one packet header field with an egress port or an egress routing information field (RIF).

In another illustrative example, a device includes one or more circuits to receive a packet that includes at least one packet header field; copy relevant bits from the at least one packet header field to a hash register; perform a search in a table for the copied relevant bits from the at least one packet header field; and in response to finding a match in the table, route the received packet based on the copied relevant bits from the at least one packet header field, wherein the table correlates the copied relevant bits from the at least one packet header field with an egress port or an egress routing information field (RIF).

In yet another illustrative example, a network includes one or more circuits to receive a packet that includes at least one packet header field; copy relevant bits from the at least one packet header field to a hash register; perform a search in a table for the copied relevant bits from the at least one packet header field; and in response to finding a match in the table, route the received packet based on the copied relevant bits from the at least one packet header field, wherein the table correlates the copied relevant bits from the at least one packet header field with an egress port or an egress routing information field (RIF).

The above example aspect includes wherein the one or more circuits are further to in response to not finding the match in the table, route the received packet using tuple hashing.

The above example aspect includes wherein the tuple hashing comprise a 5-tuple hashing.

The above example aspect includes wherein copying the relevant bits from the at least one packet header field includes the one or more circuits to mask a portion of the at least one packet header field; and mask at least another portion of the packet not needed for a bitwise operation.

The above example aspect wherein the bitwise operation comprises at least one of: a cyclic shift and a bitwise XOR.

The above example aspect wherein if the at least one packet header field is larger than the second hash register, then copying the relevant bits from the at least one packet header field includes copying the relevant bits from the at least one packet header field to multiple hash registers.

The above example aspect wherein the at least one packet header field comprises an Internet Protocol (IP) address of a source of the received packet or a Media Access Control (MAC) address of the source of the received packet.

The above example aspect wherein the one or more circuits are further to update the table based on network feedback.

The above example aspect wherein the network feedback indicates congestion on at least one egress port or congestion along at least one path.

The above example aspect wherein the table is stored in a Ternary Content Addressable Memory (TCAM).

The routing approaches depicted and described herein may be applied to a device, a processor, a Central Processing Unit (CPU), a Field Programmable Gate Array (FPGA), a switch, a router, or any other suitable type of networking device known or yet to be developed. Additional features and advantages are described herein and will be apparent from the following description and the figures.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

Figure 1:
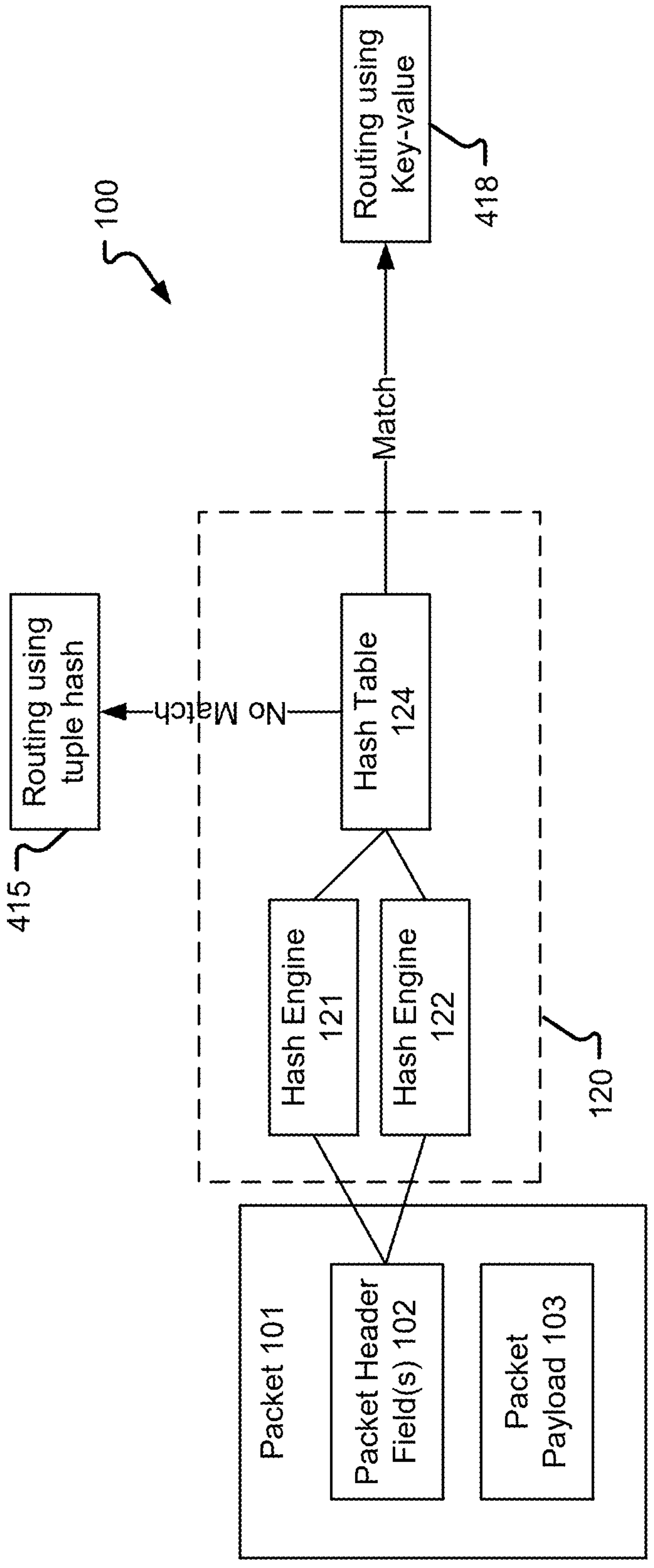
FIG. 1 is a block diagram depicting an illustrative configuration of a computing system in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It is understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a printed circuit board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," "compute," and variations thereof, as used herein, are used interchangeably, and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The present disclosure is directed to forwarding and load balancing packets between ports based on information in the packet headers (e.g., Internet Protocol (IP) address or media access control (MAC) address). The present disclosure enables the user/client to control the path each packet will traverse in the network resulting in optimal load balancing, controllability, and performance. The present disclosure includes three parts: 1) performing hash calculations on one or more fields of the packet headers; 2) determining the routing and load balancing method; and 3) choosing a path to route each packet.

Referring now to FIGS. 1-4, various systems and methods for routing packets between nodes will be described. The concepts of packet routing depicted and described herein can be applied to the routing of information from one computing device to another.

The term packet as used herein should be construed to mean any suitable discrete amount of digitized information. The data being routed may be in the form of a single packet or multiple packets without departing from the scope of the present disclosure. Furthermore, certain embodiments will be described in connection with a system that is configured to make centralized routing decisions whereas other embodiments will be described in connection with a system that is configured to make distributed and possibly uncoordinated routing decisions. It should be appreciated that the features and functions of a centralized architecture may be applied or used in a distributed architecture or vice versa.

FIG. 1 illustrates a system 100 for routing packets using packet headers. The system 100 includes a packet 101 that includes at least one packet header field 102 and a packet payload 103. A packet 101 is the basic unit of data in a transport stream, and a transport stream is merely a sequence of packets 101. Each packet 101 starts with a sync byte and a header, that may be followed with optional additional headers; the rest of the packet 101 consists of the payload 103.

The system 100 also includes a packet forwarding engine (PFE) 120, that includes hash engines 121-122. In embodiments, the PFE 120 may be included in a networking device (e.g., a switch 220). In embodiments, the PFE 120 may be included in a client device that generated the packet 101.

When the packet 101 enters the PFE 120 it will go through the two hash engines 121-122, which are configured in two different ways. Hash engines 121-122 transform data into a fixed-length string of characters. The hash engine 121 may be configured in a traditional way (e.g., 5-tuple hashing), and the hash engine 122 may be configured in the following way: the hash function is set as a logical exclusive OR (i.e., XOR) function, for two given logical statements, the XOR function returns TRUE if one of the statements is true and FALSE if both statements are true; a hash bus input is created to the hash engine containing only the desired packet.header.field.value; the relevant bits are masked from the packet.header.field.value; the field in the hash bus is aligned, if needed, such that packet.field[0] will be equal Hash[0], packet.field[1] will be equal to Hash[1] . . . ; Hash=Hash_bus[0:a]^Hash_bus[a+1:b]^hash_bus [b+1:c] . . . .

If the packet.field is larger than a number of bits of the hash input, another hash engine 122 may be used to copy the rest of the packet.field bits to another hash register, the two hash registers can be concatenated together into one big hash register containing the entire packet.header.field.value, in this case, the hash mask will enable the 0:a bits in the first hash engine 122, and will enable the rest of the fields in the second hash engine 122. This process can be done with N hash engines 122 and support any packet.field size as desired.

In embodiments, the hash engine 122 copies relevant bits from the at least one packet header field 102 to a hash register and sets it as the hash value. The hash engine 122 performs a search in a hash table 124 for the copied relevant bits from the at least one packet header field 102; and in response to finding a match in the hash table 124, routes the packet 101 based on the copied relevant bits from the at least one packet header field 102, wherein the hash table 124 correlates the copied relevant bits from the at least one packet header field 102 with an egress port or an egress routing information field (RIF) (e.g., step 418 routing using key-value pair). In embodiments, the hash table 124 is stored in ternary content-addressable memory (TCAM).

In embodiments, the hash table 124 comprises a key-value pair (KVP) data structure that consists of two related data elements: a key (e.g., a packet header field 102) and a value (e.g., egress port or egress RIF). The key is a constant that defines the data set, while the value is a variable that belongs to the set. The key is a unique identifier that is used to reference the corresponding value. The value can be any type of data, including strings, numbers, arrays, or more complex data structures. Using the hash table 124 containing the key-value pairs, a client or application can select the path or each packet. In at least one embodiment, each network device (e.g., devices 211, 220) along the path between communicating nodes has a hash table 124. For example, each device 211, 220 receives configuration data on how to configure the hash table 124.

If there is no match in the hash table 124, the packet 101 is routed using a tuple hash calculated using the hash engine 121 (e.g., step 415). In a 5-Tuple hash incoming traffic is distributed based on 5-Tuple (source IP and port, destination IP and port, protocol) hash. In a 3-Tuple hash, requests from a particular client are always directed to the same backend server based on 3-Tuple (source IP, destination IP, protocol) hash. In a 2-Tuple hash, incoming traffic is routed to the same backend server based on 2-Tuple (source/destination) hash. In embodiments, the packet header field 102 may go through the hash engine 122 to determine if there is a match and go through the hash engine 121 only if there is no match in the hash table 124.

Figure 2A:
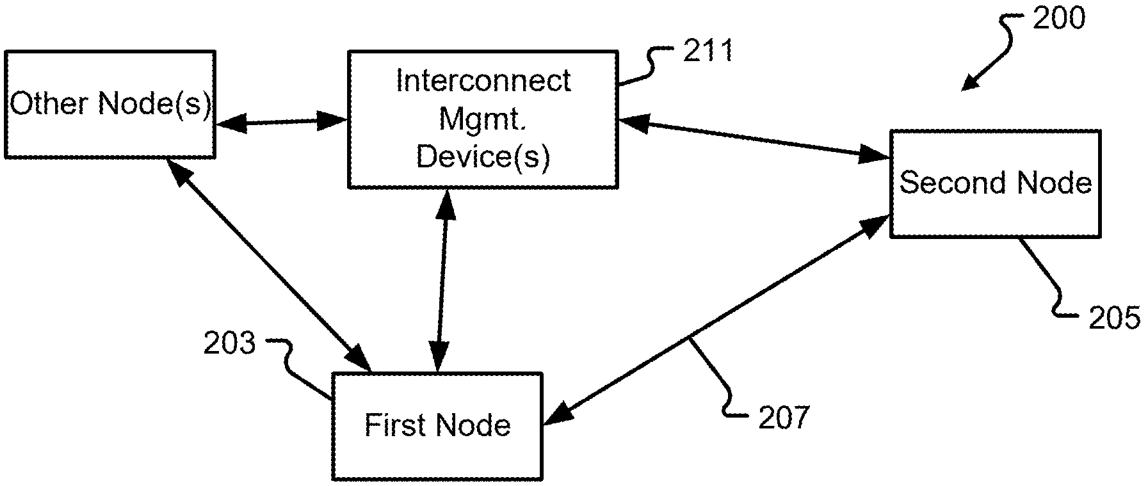
FIG. 2A is a block diagram depicting an illustrative configuration of a network in accordance with at some embodiments of the present disclosure.

Referring to FIG. 2A, a computing environment 200 as described herein may be a network of devices which may be interconnected directly (e.g., by a cable) or indirectly (e.g., by a fabric). A fabric as described herein may include one or more interconnect devices and/or one or more processing devices. The computing environment 200 may include interconnect devices, computing devices, client devices, switches, servers, CPUs, GPUs, communication nodes, or the like. Illustratively, and without limitation, the computing environment 200 may include one or more devices in a data center. For instance, the computing environment 200 may include a plurality (N) of GPUs that communicate with one another via a high-performance high-bandwidth interconnect fabric such as NVIDIA's NVLINK™ as one example. Other systems may provide a single GPU that is connected to NVLINK™.

The NVLINK™ interconnect fabric (which includes communication links 207, nodes 203, 205, interconnect management devices 211, and other devices, may provide multiple high-speed links connecting nodes 203, 205 in the form of GPUs. In the example shown, each node in the computing environment may be connected with at least one other node via one or more high-speed communication links 207. Thus, a first node 205 may connect with a second node 205 via a first communication link 207 and may be further connected to other nodes as well as the interconnect management device 211 via other communication links 207. It should be appreciated that some GPUs can connect directly with other GPUs without interconnecting through interconnect management device 211.

In the example embodiment shown, each node 203, 205 can use high-speed links 207 and/or the interconnect management device 211 to communicate with the memory provided by any or all of the other nodes. For example, there may be instances and applications in which nodes are provided in the form of a GPU and each GPU requires more memory than is provided by its own locally attached memory. As some non-limiting use cases, when a system is performing deep learning training of large models using network activation offload, analyzing "big data" (e.g., RAPIDS analytics (ETL), in-memory database analytics, graph analytics, etc.), computational pathology using deep learning, medical imaging, graphics rendering or the like, it may require more memory than is available as part of each GPU.

As one possible solution, each GPU can use links 207 and other devices (e.g., a switch) to access memory local to any other GPU as if it were the GPU's own local memory. Thus, each GPU may be provided with its own locally attached memory that it can access without initiating transactions over the interconnect fabric but may also use the interconnect fabric to address/access individual words of the local memory of other GPUs interconnected to the fabric. In some non-limiting embodiments, a GPU_1 performs a read/write request to the memory of a remote GPU_2, a network interface controller (NIC) connected to the GPU_1 creates a packet with the information to read from/write to the remote GPU_2. The NIC in the GPU_1 selects the path to the remote GPU_2 by correlating packet header information with one or more specific egress ports to optimize the path the packet traverses the network to reach the remote GPU_2.

Such access by one GPU of the local memory of another GPU may be "the same" (although not quite as fast), from the perspective of an application executing on the GPU originating the access, as if the GPU were accessing its own locally attached memory. Hardware within each GPU and hardware within a switch provides necessary address translations to map virtual addresses used by the executing application into physical memory addresses of the GPU's own local memory and the local memory of one or more other GPUs. As explained herein, such peer-to-peer access is extended to fabric attached memory without the concomitant expense of adding further compute-capable GPUs.

The nodes 203, 205 and other nodes may correspond to computational devices, communication devices, interconnect devices, or the like. The interconnect management device(s) 211 may also correspond to a computational device, communication device, or interconnect device. In some embodiments, the nodes 203, 205 may communicate directly with one another via a communication link 207. In some embodiments, a communication link between the first node 203 and second node 205 may correspond to an indirect communication link, meaning that the communication link passes through one or more interconnect devices. In either scenario, the interconnect management device 211 may be configured to monitor a status of the communication link established between the first node 203 and second node 205. When the first node 203 and second node 205 are in communication with one another via a communication link, the first node 203 and second node 205 may be considered link partners or partner nodes.

The one or more interconnect devices and interconnect management device(s) 211 may be in communication with the nodes 203, 205 either directly or indirectly. Such a network of computing devices may be useful in various settings, from data centers and cloud computing infrastructures to AI systems.

As noted above, the first node 203 and/or second node 205 may be computing units, such as personal computers, servers, or other computing devices, and may be responsible for executing applications and performing data processing tasks. Nodes 203, 205 as described herein can range from servers in a data center to desktop computers in a network, or to devices such as internet of things (IoT) sensors and smart devices. Nodes may also include processing devices which may include one or more processing circuits, such as GPUs, central processing units (CPUs), application-specific integrated circuits (ASICs), field programmable gate arrays (FPGAs), or other circuitry capable of performing computations, as well as memory and storage resources to run software applications, handle data processing, and perform specific tasks as required. In some implementations, nodes 203, 205 may also or alternatively include hardware such as GPUs for handling intensive tasks for machine learning, artificial intelligence (AI) workloads, or other complex processes.

For example, nodes 203, 205 may operate as a high-performance computing (HPC) cluster. A cluster of nodes 203, 205 provided as multiple processing devices may comprise numerous interconnected servers, each equipped with powerful CPUs and/or GPUs. The processing devices may provide computational horsepower for, as an example, training large-scale AI models or running complex scientific simulations. For AI and machine learning tasks, the processing devices may comprise one or more GPUs or other processing circuitry which may be capable of handling parallel processing requirements of neural networks and other applications.

Interconnect devices and interconnect management devices 211 may enable communication between nodes 203, 205, either directly or indirectly. An interconnect device or interconnect management device 211 may be, for example, a switch, a network interface controller (NIC), or other device capable of receiving and sending data, and may act as a central node in the network. Interconnect devices may be wired in a topology including spine switches and top-of-rack (TOR) switches for example. Interconnect devices may be capable of receiving, processing, and forwarding data, e.g., packets, to appropriate destinations within the network, such as nodes 203, 205. In some implementations, an interconnect device or interconnect management device 211 as described herein may be included in a switch box, a platform, or a case which may contain one or more interconnect devices 211 as well as one or more power supply devices.

In some implementations, each node 203, 205 may be connected to one or more ports of one or more interconnect devices 211 via network cables or wirelessly. Processes, such as applications, executed by nodes 203, 205 may involve transmitting data to other nodes of the network, such as to other processing devices and/or to client devices. Data may flow through the network of nodes and interconnect devices using one or more protocols such as transmission control protocol (TCP), user datagram protocol (UDP), or Internet protocol (IP), for example. Each interconnect device or interconnect management device 211 may, upon receiving data from a node 203, 205 or another interconnect management device 211, examine the packet headers to identify an egress port for the packet and route the packet through the network.

Client devices as described herein may be computing devices which, for example, engage in AI-related, research-related, and other processor-intensive tasks, and utilize processing devices to handle the computational loads and data throughput required by such intensive applications. Client devices may include, for example, workstations and personal computers used by researchers, data scientists, and professionals for developing, testing, and running AI models and research simulations. Client devices may include one or more CPUs and/or GPUs but may require additional computational power for complex tasks.

By interacting with processing devices, client devices may be enabled to perform functions such as training machine learning models, performing data processing, running simulations, analyzing large datasets, and performing complex data processing tasks, such as data mining, pattern recognition, and predictive modeling, for examples.

As will be described herein, the interconnect management device 211 and/or nodes 203, 205 may be provided with functionality that enable the nodes 203, 205 to use one or more packet header fields (e.g., the packet header field 102) to select a path for each packet.

Figure 2B:
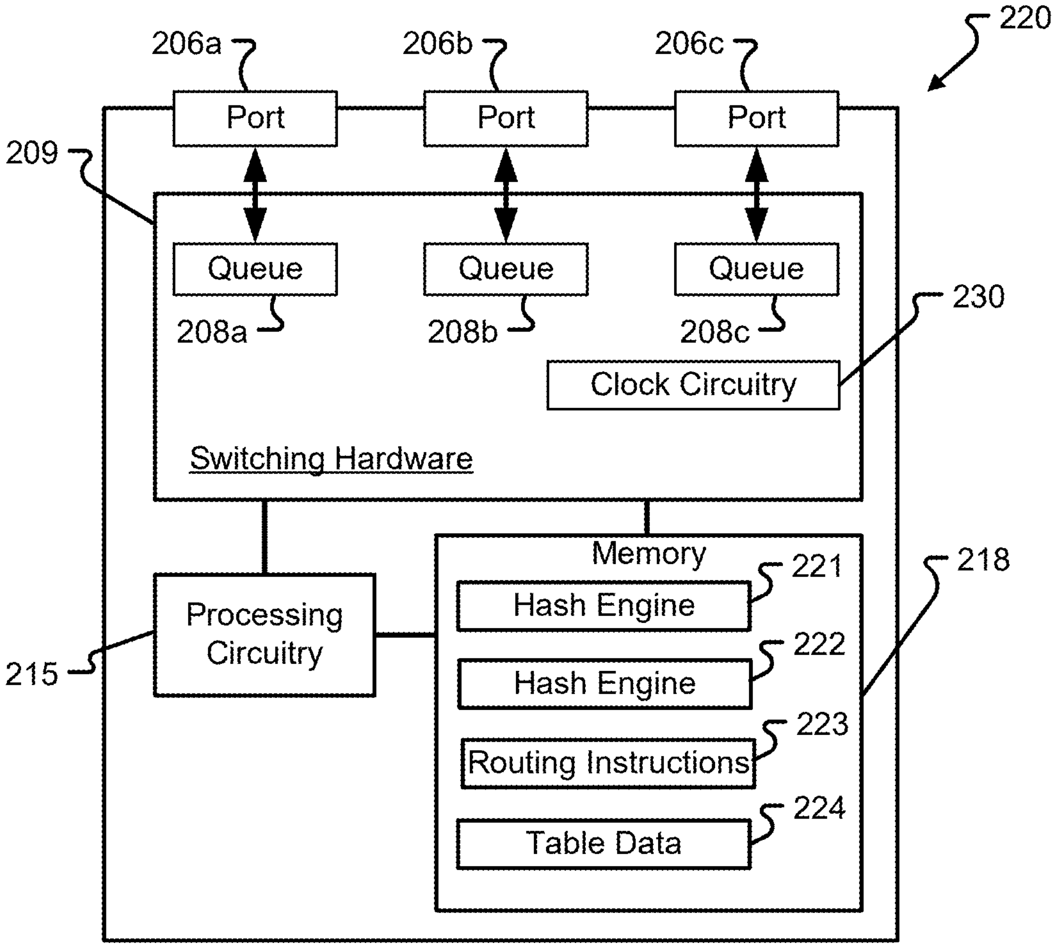
FIG. 2B illustrates a networking device in accordance with at least some embodiments of the present disclosure.

With reference now to FIG. 2B, additional details of a device 220 will be described in accordance with at least some embodiments of the present disclosure. The device 220 may correspond to the interconnect management device 211. In other words, the components of the device 220 depicted in FIG. 2B may be incorporated into the interconnect management device 211, without departing from the present disclosure.

As illustrated in FIG. 2B, a switch 220 as described herein may be a computing system comprising a number of ports 206*a-c* which may be used to interconnect with other switches 220 and/or computing systems and network devices, which may be referred to as nodes, to make up a network. For example, and as illustrated in FIG. 2B, a switch 220 may be a spine switch and/or a leaf switch and may connect to other switches 220 and/or nodes. Such a network of switches 220 and nodes may be useful in various settings, from data centers and cloud computing infrastructures to artificial intelligence systems.

Switches 220, as described in greater detail herein, may enable communication between switches 220 and/or nodes. A switch 220 may be, for example, a switch, a network interface controller (NIC), or other device capable of receiving and sending data, and may act as a central node in the network. Switches 220 may be wired in a topology including spine switches, top-of-rack (TOR) switches, and/or leaf switches, for example. Switches 220 may be capable of receiving, processing, and forwarding data, e.g., packets, to appropriate destinations within the network, such as other switches 220 and/or nodes. In some implementations, a switch 220 may be included in a switch box, a platform, or a case which may contain one or more switches 220 as well as one or more power supply devices and other components.

In some implementations, a switch 220 may comprise one or more ports 206*a-c* connected to one or more ports of other switches 220 and/or nodes. Processes, such as applications executed by nodes may involve transmitting data to other nodes of the network via switches 220. Data may flow through the network of switches 220 and nodes using one or more protocols such as transmission control protocol (TCP), user datagram protocol (UDP), or Internet protocol (IP), for example. Each switch 220 may, upon receiving data from a node or another switch 220 examine the data to identify a destination for the data and route the data through the network.

Packets 101 may be routed through the network in routes chosen at least in part based on table data 224 stored in memory 218 of each switch 220 which handles the packets. For example, and as described in greater detail herein, a switch 220 may implement an adaptive routing mechanism in which the switch 220 chooses a particular port 206*a-c* from which to forward a particular packet based on a key value pair in the table data 224. Such table data may indicate an egress port.

Each node may be a computing unit, such as a personal computer, server, or other computing device, and may be responsible for executing applications and performing data processing tasks. Nodes as described herein may range from servers in a data center to desktop computers in a network, or to devices such as internet of things (IOT) sensors and smart devices as examples. Each node may for example include one or more processing circuits, such as graphics processing units (GPUs), central processing units (CPUs), application-specific integrated circuits (ASICs), field programmable gate arrays (FPGAs), or other circuitry capable of performing computations, as well as memory and storage resources to run software applications, handle data processing, and perform specific tasks as required. In some implementations, nodes may also or alternatively include hardware such as GPUs for handling intensive tasks for machine learning, artificial intelligence (AI) workloads, or other complex processes.

For example, nodes communicating via switches 220 may operate as a high-performance computing (HPC) cluster. A cluster of nodes may comprise numerous interconnected servers, each equipped with CPUs and/or GPUs. The nodes may provide computational horsepower for, as an example, training large-scale AI models or running complex scientific simulations. For AI and machine learning tasks, the nodes may comprise one or more GPUs or other processing circuitry which may be capable of handling parallel processing requirements of neural networks and other applications.

Nodes may be client devices which, for example, engage in AI-related, research-related, and other processor-intensive tasks, and utilize a network of switches 220 and other nodes to handle the computational loads and data throughput required by such intensive applications. Such nodes may include, for example, workstations and personal computers used by researchers, data scientists, and professionals for developing, testing, and running AI models and research simulations.

A switch 220 as described herein may in some implementations be as illustrated in FIG. 2B. Such a switch 220 may include a plurality of ports 206*a-c*, queues 208*a-c*, switching hardware 209, processing circuitry 215, and memory 218. The ports 206*a-c* of a switch 220 may be capable of facilitating the transmission of data packets, or non-packetized data, into, out of, and through the switch 220. Such ports 206*a-c* may serve as interface points where network cables may be connected, connecting the switch 220 with other switches 220, and/or nodes.

Each port 206 may be capable of receiving incoming data packets from other devices and/or transmitting outgoing data packets to other devices. In some implementations, ports 206 may be configured to operate as either dedicated ingress or egress ports 206 or may be enabled to operate in a dual functionality capable of performing ingress and egress functions. For example, an egress port 206 may be used exclusively for sending data from the interconnect device and an ingress port 206 may be used solely for receiving incoming data into the switch 220.

Switching hardware 209 of a switch 220 may be capable of handling a received packet by determining a port 206 from which to send the packet and forwarding the packet from the determined port 206. Each port 206 of a switch 220 may be associated with one or more queues 208*a-c*. When a packet, or data in any format, is to be sent from a port 206, the packet may be stored in a queue 208 associated with the port 206 until the port 206 is ready to send the packet.

Switching hardware 209 of a switch 220 may also include clock circuitry 230. In some implementations, clock circuitry 230 may comprise a crystal oscillator or other circuit capable of providing an electrical signal at a particular frequency. Clock circuitry 230 may also or alternatively include one or more clock generators and other elements capable of providing counters and timers as described herein.

In support of the functionality of the switching hardware 209, processing circuitry 215 may be configured to control aspects of the switching hardware 209 to route packets using information in packet headers. The processing circuitry 215 may in some implementations include a CPU, an ASIC, and/or other processing circuitry which may be capable of handling computations, decision-making, and management functions required for operation of the switch 220.

Processing circuitry 215 may be configured to handle management and control functions of the switch 220, such as setting up routing tables, configuring ports, and otherwise managing operation of the switch 220. Processing circuitry 215 may execute software and/or firmware to configure and manage the switch 220, such as an operating system and management tools. In some implementations, the processing circuitry 215 may be configured to receive packet header field 102. Processing circuitry 215 may be capable of routing packets based on the packet header field 102 in a packet 101.

Memory 218 of a switch 220 as described herein may comprise one or more memory elements capable of storing configuration settings, application data, operating system data, hash engines 221-222, routing instructions 223, table data 224, and other data. Such memory elements may include, for example, random access memory (RAM), dynamic RAM (DRAM), flash memory, non-volatile RAM (NVRAM), ternary content-addressable memory (TCAM), static RAM (SRAM), and/or memory elements of other formats.

Table data 224 may include key value pairs that correlate a value of a packet header field with an egress port/egress RIF as described below. Table data 224 may be used by the switch 220 to route the packet.

A number of switches 220 may be interconnected and also connected to nodes to form a network. Each arrow in FIG. 2B may represent any number of one or more connections between the various elements. For example, ports 206 of a first switch 220 may be connected to one or more ports 206 of a second switch 220. Each connection between a switch 220 and another switch 220 or node may be used to carry multiple flows. Flows may also be static flows or adaptive routing flows. Static flows may be flows which cannot be rerouted via different routes through the network while adaptive routing flows may be flows which can be routed via a variety of different routes to reach the proper destination. As an example, each node may transmit static flows and/or adaptive flows to other nodes via the switches 220.

Figure 3:
FIG. 3 illustrates an illustrative configuration of a flow in accordance with at least some embodiments of the present disclosure.

FIG. 3 illustrates an example flow 300 of using packet header field(s) to route packets. One or more packet header field(s) 302 are processed using a hash engine 322. The hash engine 322 may be configured as follows: the Hash function is set as XOR; a hash bus input is created to the hash engine containing only the desired packet.header.field.value; the relevant bits are masked from the packet.header.field.value; the field in the hash bus is aligned, if needed.

All packets that are classified as eligible for routing based on packet header field will have a hash value=packet.header.field.value match in the table 324. In other words, the hash value of the packet header field 302 will be the key to the table 324, and the value corresponding to the key will be the egress port or egress RIF 306 that the packet should egress from. The size of the table 324 may be such that all the possible packet.header.field.values exist in the table 324. The user may select the packet.header.field.value for each packet in order to select the path for each packet. In embodiments, the user may implement a round robin selection of packet.header.field.values to perform round robin load balancing on the egress ports.

Additionally, the system may receive feedback from the network (e.g., congestion/path failure notifications) and change the packet.header.field.value(s) in the table 324 accordingly, resulting in optimized distribution/load balancing. The key: value fields may have N keys but only n<N different values which enables weighted load balancing.

Figure 4:
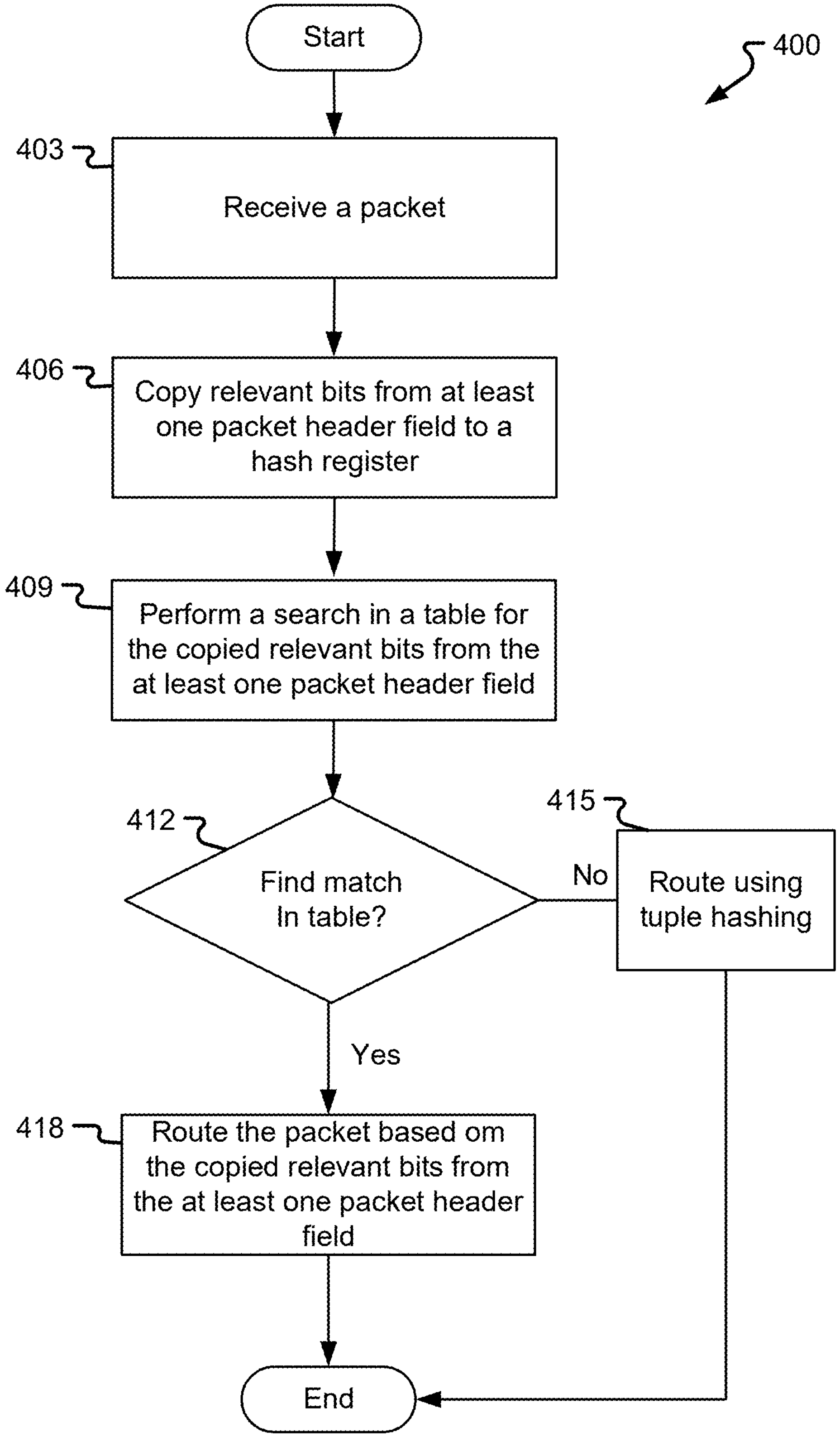
FIG. 4 is a flow diagram depicting a method in accordance with at least some embodiments of the present disclosure.

As illustrated in FIG. 4, a device (e.g., a switch 220) may perform a method 400 of routing packets based on packet headers. The method 400 may begin at step 403 when the device receives a packet, wherein the packet includes at least one packet header field (e.g., packet header field 102). At step 406, the relevant bits are copied from the at least one packet header field to a hash register. Copying the relevant bits may include concatenating (e.g., if the packet.header.field.value is larger than the hash register), masking irrelevant bits, and aligning, if needed. In embodiments, a hash engine (e.g., the hash engine 122) copies the relevant bits for the packet header field into its hash register.

At step 409, a table (e.g., hash table 124 or 324) is searched for the copied relevant bits from the packet header field. In embodiments, a cyclic shift XOR is performed on the hash register to each entry in the table. In embodiments, the table that correlates a packet.header,field.value with an egress port/egress routing information field (RIF) is stored in TCAM. At step 412, if a no match is found (No), at step 415 the packet is routed using tuple (e.g., 5-tuple) hashing or the result of the hash engine 121. In embodiments, the hash engines 121-122 may simultaneously perform a hash on the packet header field, and produce a result. In embodiments, the hash engine 122 may perform a hash on the packet header field, and the hash engine 121 performs a hash on the packet header field, only if no match is found in the table. At step 412, if a match is found in the table (Yes), at step 418 the packet is routed using the value (e.g., egress port/egress RIF) from the table (e.g., hash table 124 or 324).

In embodiments, the method 400 may be stored as routing instructions 223 in memory 218 of a switch 220.

It is to be appreciated that any feature described herein can be claimed in combination with any other feature(s) as described herein, regardless of whether the features come from the same described embodiment.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A system comprising one or more circuits to:

receive a packet that includes at least one packet header field;

copy relevant bits from the at least one packet header field to a hash register;

perform a search in a table for the copied relevant bits from the at least one packet header field; and in response to finding a match in the table, route the received packet based on the copied relevant bits from the at least one packet header field, wherein the table correlates the copied relevant bits from the at least one packet header field with an egress port or an egress routing information field (RIF).

2. The system of claim 1, wherein the one or more circuits are further to:

in response to not finding the match in the table, route the received packet using tuple hashing.

3. The system of claim 2, wherein the tuple hashing comprises a 5-tuple hashing.

4. The system of claim 1, wherein copying the relevant bits from the at least one packet header field includes the one or more circuits to:

mask a portion of the at least one packet header field; and mask at least another portion of the packet not needed for a bitwise operation, wherein the bitwise operation comprises at least one of: a cyclic shift and a bitwise XOR.

5. The system of claim 4, wherein if the at least one packet header field is larger than the hash register, then copying the relevant bits from the at least one packet header field includes copying the relevant bits from the at least one packet header field to multiple hash registers.

6. The system of claim 1, wherein the packet header field comprises an Internet Protocol (IP) address of a source of the received packet or a Media Access Control (MAC) address of the source of the received packet.

7. The system of claim 1, wherein the one or more circuits are further to:

update the table based on network feedback.

8. The system of claim 7, wherein the network feedback indicates congestion on at least one egress port or congestion along at least one path.

9. The system of claim 1, wherein the table is stored in a Ternary Content Addressable Memory (TCAM).

10. A device comprising one or more circuits to:

receive a packet that includes at least one packet header field;

copy relevant bits from the at least one packet header field to a hash register;

perform a search in a table for the copied relevant bits from the at least one packet header field; and in response to finding a match in the table, route the received packet based on the copied relevant bits from the at least one packet header field, wherein the table correlates the copied relevant bits from the at least one packet header field with an egress port or an egress routing information field (RIF).

11. The device of claim 10, wherein the one or more circuits are further to:

in response to not finding the match in the table, route the received packet using tuple hashing.

12. The device of claim 11, wherein the tuple hashing comprises a 5-tuple hashing.

13. The device of claim 10, wherein the one or more circuits are further to:

mask a portion of the at least one packet header field; and mask at least another portion of the packet not needed for a bitwise operation.

14. The device of claim 13, wherein the bitwise operation comprises at least one of: a cyclic shift and a bitwise XOR.

15. The device of claim 10, wherein the one or more circuits are further to:

update the table based on network feedback.

16. The device of claim 15, wherein the network feedback indicates congestion on at least one egress port or congestion along at least one path.

17. A switch comprising one or more circuits to:

receive a packet that includes at least one packet header field;

use a first hash engine to hash the at least one packet header field to a first hash register;

use a second hash engine to copy relevant bits from the at least one packet header field to a second hash register;

perform a search in a table for the copied relevant bits from the at least one packet header field in the second hash register;

in response to finding a match in the table, route the received packet based on the copied relevant bits from the at least one packet header field, wherein the table correlates the copied relevant bits from the at least one packet header field with an egress port or an egress routing information field (RIF); and in response to not finding the match in the table, route the packet using data in the first hash register.

18. The switch of claim 17, wherein the at least one packet header field comprises an Internet Protocol (IP) address of a source of the received packet or a Media Access Control (MAC) address of the source of the received packet.

19. The switch of claim 17, wherein the one or more circuits are further to:

update the table based on network feedback, wherein the network feedback indicates congestion on at least one egress port or congestion along at least one path.

20. The switch of claim 17, wherein the one or more circuits are further to:

mask a portion of the packet header field; and mask at least another portion of the packet not needed for a bitwise operation, wherein the bitwise operation comprises at least one of: a cyclic shift and a bitwise XOR.

* * * * *